United States Patent
Manning et al.

(10) Patent No.: US 6,599,092 B1
(45) Date of Patent: Jul. 29, 2003

(54) METHODS AND APPARATUS FOR COOLING GAS TURBINE NOZZLES

(75) Inventors: Robert F. Manning, Newburyport, MA (US); Randall B. Rydbeck, Hamilton, MA (US); Christopher Roach, Wollaston, MA (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 10/039,719

(22) Filed: Jan. 4, 2002

(51) Int. Cl.[7] .................................. F01D 9/06
(52) U.S. Cl. ..................... 416/97 R; 415/115; 415/191; 416/97 A
(58) Field of Search ................. 415/115, 191, 415/116; 416/90 R, 1, 96 R, 96 A, 97 R, 97 A

(56) References Cited

U.S. PATENT DOCUMENTS

| | | | |
|---|---|---|---|
| 4,515,523 A | * | 5/1985 | North et al. ................. 415/115 |
| 4,726,104 A | | 2/1988 | Foster et al. |
| 5,215,431 A | | 6/1993 | Derrien |
| 5,288,207 A | * | 2/1994 | Linask ...................... 416/97 R |
| 5,342,172 A | | 8/1994 | Coudray et al. |
| 5,462,405 A | * | 10/1995 | Hoff et al. ................. 416/97 R |
| 5,503,527 A | | 4/1996 | Lee et al. |
| 5,503,529 A | | 4/1996 | Anselmi et al. |
| 5,772,398 A | | 6/1998 | Noiret et al. |
| 6,174,135 B1 | | 1/2001 | Lee |

* cited by examiner

Primary Examiner—Edward K. Look
Assistant Examiner—Dwayne J. White
(74) Attorney, Agent, or Firm—William Scott Andes; Armstrong Teasdale LLP; Robert B. Reeser, III

(57) ABSTRACT

A method for fabricating a nozzle for a gas turbine engine facilitates extending a useful life of the nozzles. The nozzle includes an airfoil. The method includes forming the airfoil to include a suction side and a pressure side connected at a leading edge and a trailing edge, forming a plurality of slots in the pressure side of the airfoil extending towards the trailing edge, and extending a plurality of pins arranged in rows between the airfoil suction and pressure sides, such that at each of a first row of pins has a substantially elliptical cross-sectional area, wherein the first row of pins is between the remaining rows of pins and the airfoil pressure side slots.

20 Claims, 3 Drawing Sheets

METHODS AND APPARATUS FOR COOLING GAS TURBINE NOZZLES

BACKGROUND OF THE INVENTION

This invention relates generally to gas turbine engine nozzles and more particularly, to methods and apparatus for cooling gas turbine engine nozzles.

Gas turbine engines include combustors which ignite fuel-air mixtures which are then channeled through a turbine nozzle assembly towards a turbine. At least some known turbine nozzle assemblies include a plurality of nozzles arranged circumferentially within the engine downstream from the combustors. Each nozzle includes an airfoil vane that extends between integrally-formed inner and outer band platforms. The nozzles are cooled by a combination of internal convective cooling and gas side film cooling.

Each nozzle includes a pair of sidewalls that are connected at a leading edge and a trailing edge. The metal temperature distribution of a typical vane airfoil is such that the trailing edge is significantly hotter than a temperature of the bulk of the airfoil. The temperature gradient created results in high compressive stress at the vane trailing edge, and the combination of high stresses and high temperatures generally results in the vane trailing edge being the life limiting location of the nozzle. Accordingly, within at least some known nozzles, the airfoil vane trailing edge is cooled by a film of cooling air discharged from an internally-defined vane cavity. More specifically, the film of cooling air is discharged through trailing edge slots formed on the airfoil vane pressure side, and upstream from the airfoil vane trailing edge.

The amount of air supplied to each nozzle vane is attempted to be optimized to lessen the effect on engine performance decrement that may be associated with cooling flow extraction. Generally, the slots are formed with a length that facilitates optimizing an amount of cooling flow supplied to the trailing edge. Because of the slot length, such slots are typically manufactured using an electrical discharge machining (EDM) process. However, such a manufacturing process may increase manufacturing costs and times, and because of the complexity of the task may cause airfoil vanes to be reworked. A nozzle design including an internal cooling geometry that is comparable with the investment casting process generally is less expensive to manufacture relative to a nozzle design that requires the EDM process to produce the slots.

BRIEF SUMMARY OF THE INVENTION

In one aspect, a method for fabricating a nozzle for a gas turbine engine is provided. The nozzle includes an airfoil. The method comprises forming the airfoil to include a suction side and a pressure side connected at a leading edge and a trailing edge, forming a plurality of slots in the pressure side of the airfoil extending towards the trailing edge, and extending a plurality of pins arranged in rows between the airfoil suction and pressure sides, such that at each of a first row of pins has a substantially elliptical cross-sectional area, wherein the first row of pins is between the remaining rows of pins and the airfoil pressure side slots.

In another aspect of the invention, a turbine nozzle for a gas turbine engine is provided. The nozzle includes an airfoil vane including a first wall, a second wall, and a plurality of pins extending therebetween. The first and second walls are connected at a leading edge and a trailing edge. The first wall includes a plurality of slots that extend towards the trailing edge. The plurality of pins include at least a first row of pins which have a substantially elliptical cross-sectional area. The first row of pins is positioned between the remaining plurality of pins and the first wall slots.

In a further aspect, an airfoil for a gas turbine engine nozzle is provided. The airfoil includes a root, a tip, a plurality of pins, a convex sidewall and a concave sidewall connected at a trailing edge. Each of the sidewalls extends between the root and tip. The convex sidewall defines a pressure side of the airfoil and includes a plurality of slots that extend towards the trailing edge. The plurality of pins include at least a first row of pins and a second row of pins. The first row of pins are concentrically aligned radially and each of the first row pins has a substantially elliptical cross sectional profile and is tapered such that an upstream side of each first row pin has a width that is greater than a downstream side of each first row pin. The slots are adjacent to and downstream from the first row of pins.

DETAILED DESCRIPTION OF THE INVENTION

Figure 1:
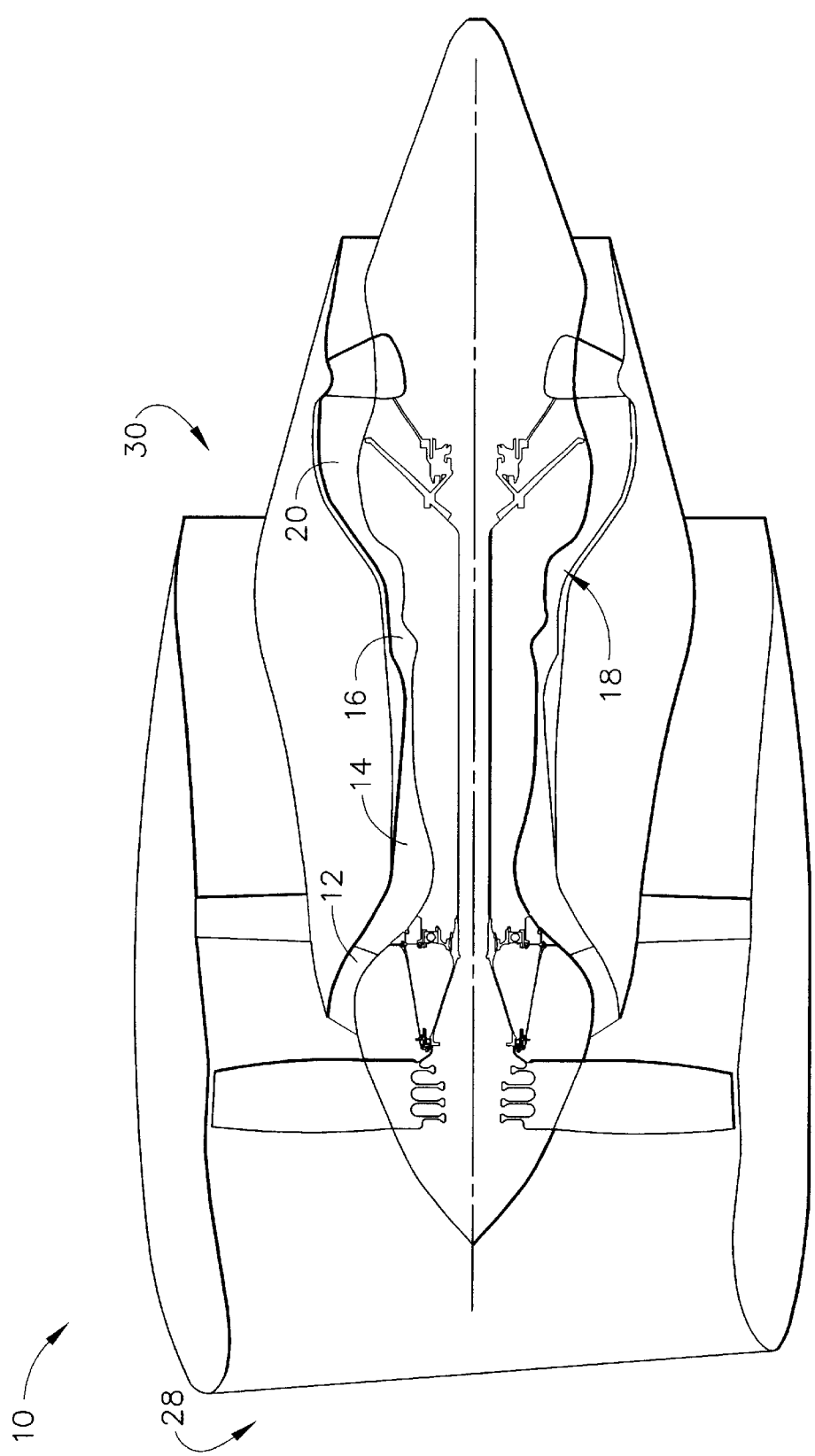
FIG. 1 is a schematic illustration of a gas turbine engine.

FIG. 1 is a schematic illustration of a gas turbine engine 10 including a fan assembly 12, a high-pressure compressor 14, and a combustor 16. Engine 10 also includes a high-pressure turbine 18 and a low-pressure turbine 20. Engine 10 has an intake, or upstream, side 28 and an exhaust, or downstream, side 30. In one embodiment, engine 10 is a CF6-80 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 is discharged through a turbine nozzle assembly (not shown in FIG. 1) that includes a plurality of nozzles (not shown in FIG. 1) and used to drive turbines 18 and 20. Turbine 20, in turn, drives fan assembly 12, and turbine 18 drives high-pressure compressor 14.

Figure 2:
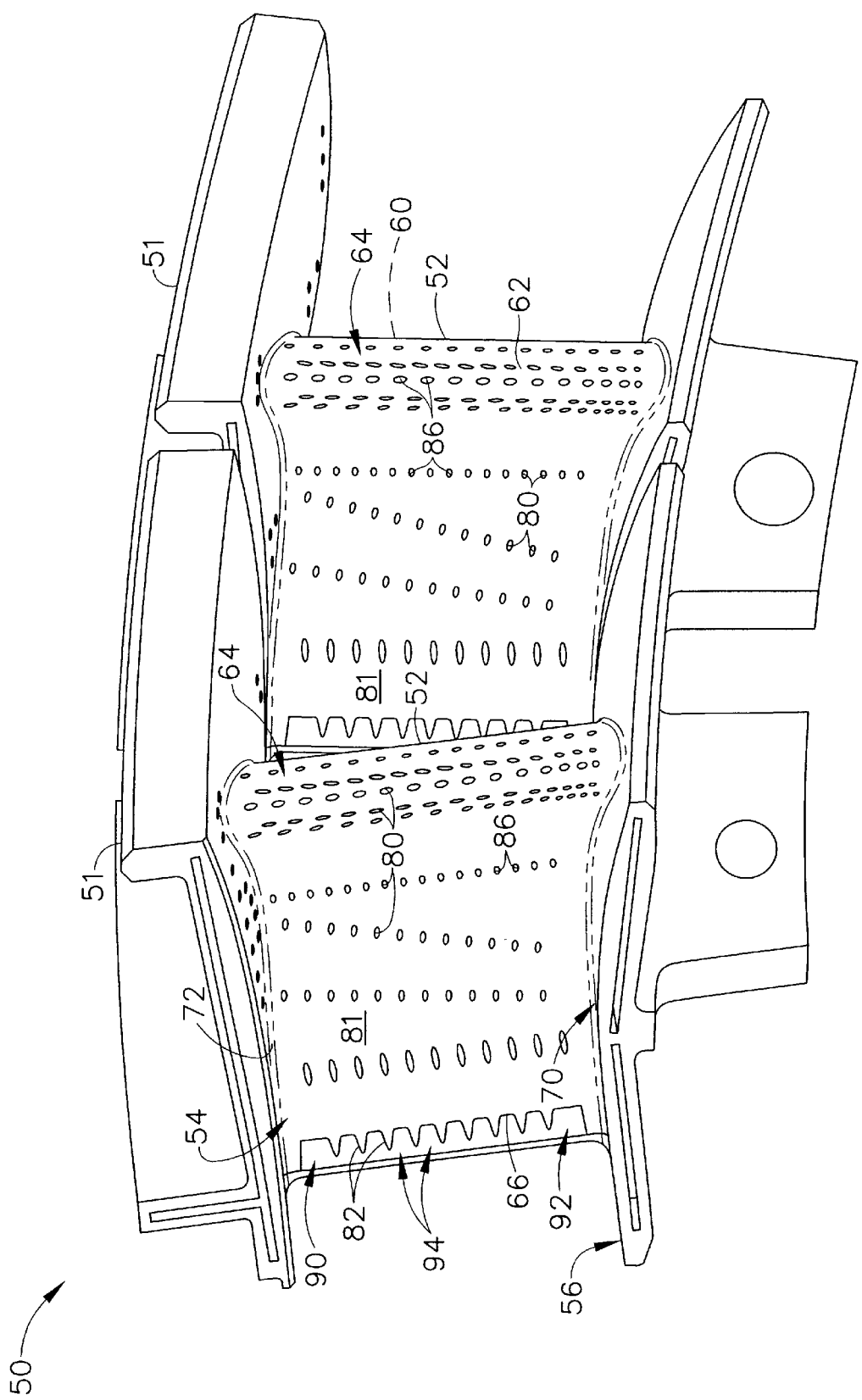
FIG. 2 is a perspective view of a turbine nozzle assembly that may be used with the gas turbine engine shown in FIG. 1.
Figure 3:
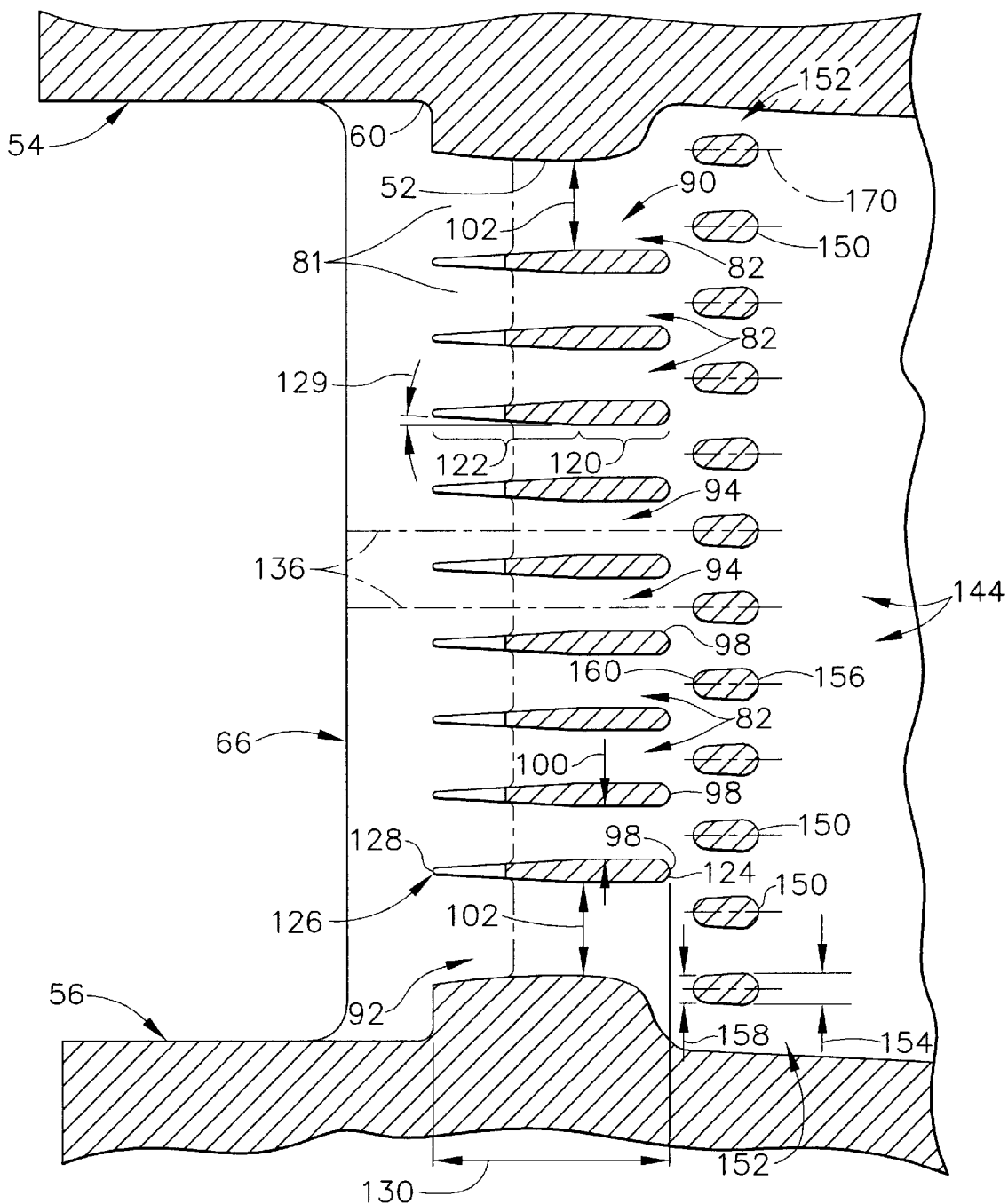
FIG. 3 is an enlarged schematic cross-sectional view of a turbine nozzle shown in FIG. 2.

FIG. 2 is a perspective view of turbine nozzle assembly 50 that may be used with a gas turbine engine, such as engine 10 (shown in FIG. 1). Nozzle assembly 50 includes a plurality of nozzles 51 which extend circumferentially within engine 10. FIG. 3 is an enlarged schematic cross-sectional view of a portion of a turbine nozzle 51 used with nozzle assembly 50. Each nozzle 51 includes an airfoil vane 52 that extends between a radially outer band or platform 54 and a radially inner band or platform 56. More specifically, in the exemplary embodiment, each band 54 and 56 is formed integrally with each airfoil vane 52.

Each airfoil vane 52 includes a first sidewall 60 and a second sidewall 62. First sidewall 60 is convex and defines a suction side of airfoil vane 52, and second sidewall 62 is concave and defines a pressure side of airfoil vane 52. Sidewalls 60 and 62 are joined at a leading edge 64 and at an axially-spaced trailing edge 66 of airfoil vane 52.

First and second sidewalls 60 and 62, respectively, extend longitudinally, or radially outwardly, in span from radially inner band 56 to radially outer band 54. An airfoil root 70 is defined as being adjacent inner band 56, and an airfoil tip 72 is defined as being adjacent outer band 54. Additionally, first and second sidewalls 60 and 62, respectively, define a cooling chamber (not shown) within airfoil vane 52. More specifically, the cooling chamber is bounded by an inner surface (not shown) of each respective sidewall 60 and 62.

Second sidewall 62 defines a pressure side of airfoil vane 52 and includes a plurality of cooling openings 80 extending therethrough and in flow communication with the cooling chamber. In one embodiment, the nozzle cooling chamber receives cooling air discharged from a compressor, such as compressor 14 (shown in FIG. 1). Openings 80 discharge cooling air onto an external surface 81 of airfoil vane 52. More specifically, film cooling openings 80 include trailing edge diffusion slots 82 and a plurality sidewall film cooling openings 86. It should be noted that the arrangement and number of openings 80 is variable.

Diffusion slots 82 extend through second sidewall 62 and extend towards airfoil trailing edge 66, and include a pair of identical first slots 90 and 92 adjacent each respective platform band 54 and 56, and a plurality of identical body slots 94 spaced radially between slots 90 and 92. Adjacent diffusion slots 82 are separated by land areas 98, such that a slot radial height is defined for each slot 82 between adjacent land areas 98. Accordingly, because slots 94 are identical, a radial height 100 of each slot 94 is the same, and because slots 90 and 92 are identical, a radial height 102 of each slot 90 and 92 is the same, and is larger than slot radial height 100. More specifically, each slot 90 and 92 has a radial height 102 that is approximately twice that of a radial height 100 of each slot 94. In the exemplary embodiment, each slot 90 and 92 has a radial height 102 equal approximately 0.090 inches, and each slot 94 has a radial height 100 equal approximately 0.045 inches. The difference in radial heights 102 and 100 facilitates relieving thermal strain at airfoil trailing edge 66 due to a mismatch in thermal growth between airfoil vane 52 and bands 54 and 56. Furthermore, the slot geometry facilitates enhancing cooling in airfoil vane 52 adjacent each band 54 and 56.

Each land area 98 is divergent and includes an upstream portion 120 and a downstream portion 122. Upstream portion 120 is curved and extends between a leading edge 124 and downstream portion 122. In the exemplary embodiment, upstream portion 120 is substantially semi-circular. Downstream portion 122 extends from upstream portion 120 to an apex 126 at a trailing edge 128. Downstream portion 122 is substantially triangular-shaped and defines a half angle of diffusion 129 for each diffusion slot 82. In the exemplary embodiment, each slot 82 has a half angle of diffusion 129 that is equal approximately seven degrees.

Each land area 98 also has a length 130 measured between each land area leading edge 124 and each respective land area trailing edge 126. In the exemplary embodiment, each land area has a length 130 that is approximately equal 0.155 inches. Land areas 98 are also equi-spaced and-as such, each slot 82 has a centerline 136. Slot centerlines 136 are substantially parallel.

Airfoil vane 52 also includes a pin bank 144 that includes a plurality of pins 150 that extend through the cooling chamber between sidewalls 60 and 62. Pin bank 144 facilitates inducing turbidity into cooling air flowing through the cooling chamber. More specifically, in the exemplary embodiment, each vane 52 includes at least a row of first pins 152 that are immediately upstream from diffusion slots 82, between remaining pins 150 and slots 82. Pins 152 extend radially between platform bands 54 and 56, and are radially-aligned.

Each pin 150 has a substantially elliptical cross-sectional area and is tapered towards airfoil vane trailing edge 66. Tapering each pin 150 facilitates enhancing a local velocity of cooling air flowing through the cooling chamber towards diffusion slots 82, and thus, facilitates increasing cooling effectiveness within airfoil vane 52 between pins 150 and airfoil vane trailing edge 66. More specifically, each pin 150 has a radial width 154 at a pin leading edge 156 that is greater than a radial width 158 at a pin trailing edge 160. Tapering pins 150 facilitates reducing pressure losses of cooling air flowing through the cooling chamber. Furthermore, the geometry configuration within nozzle vane 52 enables each land area 98 to be fabricated with a shorter length 130 than other known nozzles that includes trailing edge diffusion slots. The shorter length 130 of each land area 98 facilitates each airfoil vane 52 being manufactured with an investment casting process.

Each pin 150 also has a centerline 170 that extends between leading and trailing edges 156 and 160, respectively. Pins 150 extending immediately upstream from body diffusion slots 94 are positioned such that each pin centerline 170 is substantially co-linear with each slot centerline 136, and are thus parallel with centerlines 136 extending through slots 90 and 92.

Airfoil vanes 52 are fabricated by casting a core (not shown). The core is fabricated by injecting a liquid ceramic and graphite slurry into a core die (not shown), and the slurry is heated to form a solid ceramic airfoil core. The airfoil core is suspended in an airfoil die (not shown) and hot wax is injected into the airfoil vane die to surround the ceramic airfoil core. The hot wax solidifies and forms a wax airfoil vane with the ceramic core suspended in the airfoil vane.

The wax airfoil vane with the ceramic core is then inserted into the airfoil vane die and molten metal is injected into the die. The molten metal melts, and takes the place of, the wax airfoil vane, and forms a metal airfoil vane with the ceramic core remaining in place. The airfoil vane is then cooled, and the ceramic core removed. Because nozzles 51 can be fabricated with an investment casting process, manufacturing costs associated with nozzles 51 are reduced in comparison to other known nozzles.

In operation, cooling air is supplied to each into each airfoil vane cooling chamber from a high pressure compressor. The cooling air is channeled through selectively turbulated cavities (not shown) and through a pin bank cooling array 144 upstream from trailing edge diffusion slots 82. The cooling air is also discharged through the airfoil cooling openings 80 to provide a buffer layer of cooling air to airfoil external surface 81. This buffer layer, or film layer, is substantially cooler than combustor discharge air passing through nozzle 51. Airfoil trailing edge 66 and the surrounding trailing edge region, are cooled by cooling air flowing through pin bank 144 and through diffusion slots 82. The combination of pins 150 and slots 90, 92, and 94 facilitate providing balanced airfoil cooling while minimizing a flow level of cooling air passing through airfoil vane 52. More specifically, pins 150 and slots 82 facilitate reducing nozzle metal temperatures to extend a useful life of nozzles 50.

The above-described turbine nozzle include a geometry configuration that facilitates extending a useful life of the turbine nozzle. Each nozzle airfoil vane includes a row of diffusion slots that include an oversized slot adjacent each platform band. The oversized slots facilitate cooling the regions of the airfoil vane adjacent the platforms. Furthermore, each nozzle airfoil vane also includes a row of tapered pins that are immediately upstream and axiallyaligned with respect to each respective slot. The pins facilitate enhanced cooling and flow regulation with improved manufacturing yeilds. As a result, the geometry configuration of the nozzles facilitate extending a useful life of the nozzles in a cost-effective and reliable manner.

While the invention has been described in terms of various specific embodiments, those skilled in the art will recognize that the invention can be practiced with modification within the spirit and scope of the claims.

What is claimed is:

1. A turbine nozzle for a gas turbine engine, said nozzle comprising an airfoil vane comprising a first wall, a second wall, and a plurality of pins extending therebetween, said first and second walls connected at a leading edge and a trailing edge, said first wall comprising a plurality of slots extending towards said trailing edge, said plurality of pins comprising at least a first row of pins having a substantially elliptical cross-sectional area, said first row of pins between said remaining plurality of pins and said first wall slots.

2. A turbine nozzle in accordance with claim 1 wherein said airfoil first row of pins is tapered such that a downstream side of each said pin has a width that is less than an upstream side of each said pin.

3. A turbine nozzle in accordance with claim 1 wherein said airfoil further comprises a root, a tip, and a plurality of land areas, said first and second walls extending radially between said root and said tip, said plurality of land areas separate said slots, each said slot having a radial height extending between adjacent said land areas.

4. A turbine nozzle in accordance with claim 3 wherein each said slot comprises a centerline, each said first row pin comprises a centerline, each said first row pin centerline substantially parallel to each said slot centerline.

5. A turbine nozzle in accordance with claim 3 wherein at least one of said airfoil land areas between adjacent said slots comprises a substantially semi-circular-shaped upstream side and a substantially triangular-shaped downstream side.

6. A turbine nozzle in accordance with claim 3 wherein said first wall defines a pressure side of said nozzle, said first row of pins and said first wall slots configured to provide cooling air to said airfoil to facilitate extending a useful life of said nozzle.

7. A turbine nozzle in accordance with claim 3 wherein said airfoil plurality of slots further comprise a first slot adjacent said airfoil root, a second slot adjacent said airfoil tip, and a plurality of identical third slots extending between said first and second slots, each said third slot having a radial height less than a radial height of said first and said second slots.

8. A turbine nozzle in accordance with claim 7 wherein said airfoil first and second slots are identical and have a radial height that is approximately twice each said third slot.

9. An airfoil for a gas turbine engine nozzle, said airfoil comprising a root, a tip, a plurality of pins, a convex sidewall and a concave sidewall connected at a trailing edge, each said sidewall extending between said root and tip, said convex sidewall defining a pressure side of said airfoil and comprising a plurality of slots extending towards said trailing edge, said plurality of pins comprising at least a first row of pins and a second row of pins, said first row of pins concentrically aligned radially, each said first row pin having a substantially elliptical cross sectional profile and tapered such that an upstream side of each said first row pin has a width that is greater than a downstream side of each said first row pin, said slots adjacent to and downstream from said first row of pins.

10. An airfoil in accordance with claim 9 wherein said plurality of slots are defined by a plurality of land areas such that each said slot comprises a radial height, said plurality of slots comprising a first slot adjacent said airfoil root, a second slot adjacent said airfoil tip, and a plurality of third slots extending between said first and second slots.

11. An airfoil in accordance with claim 10 wherein each said land area defining a third slot comprises a substantially semi-circular-shaped upstream portion and a substantially triangular-shaped downstream portion extending from said upstream portion.

12. An airfoil in accordance with claim 10 wherein each of said plurality of slots has a radial height, each of said plurality of third slots having a radial height less than each of said first and second slots.

13. An airfoil in accordance with claim 10 wherein each of said plurality of slots has a radial height, said first and second slots identical and having a radial height that is approximately twice that of said plurality of third slots.

14. An airfoil in accordance with claim 10 wherein each said slot comprises a centerline, each said first row pin comprises a centerline, each said first row pin centerline substantially parallel with each said slot area centerline.

15. A method for fabricating a nozzle for a gas turbine engine, the nozzle including an airfoil, said method comprising:

forming the airfoil to include a suction side and a pressure side connected at a leading edge and a trailing edge;

forming a plurality of slots in the pressure side of the airfoil extending towards the trailing edge; and extending a plurality of pins arranged in rows between the airfoil suction and pressure sides, such that at each of a first row of pins has a substantially elliptical cross-sectional area, wherein the first row of pins is between the remaining rows of pins and the airfoil pressure side slots.

16. A method in accordance with claim 15 wherein forming the airfoil further comprises casting the airfoil.

17. A method in accordance with claim 15 wherein forming a plurality of slots further comprises forming a plurality of slots to extend radially between an airfoil root and an airfoil tip, such that a first slot is adjacent the airfoil root, a second slot is adjacent the airfoil root, and a plurality of identical third slots extend between the first and second slots.

18. A method in accordance with claim 17 wherein forming a plurality of slots in the pressure side further comprises defining the slots with adjacent land areas such that a radial height of each of the third slots is less than a radial height of the first and second slots.

19. A method in accordance with claim 18 wherein defining the slots further comprises defining the slots such that the first and second slots are identical and have a radial height that is approximately twice that of each of the plurality of third slots.

20. A method in accordance with claim 18 wherein defining the slots further comprises defining the slots with adjacent land areas such that each land area has a substantially semi-circular-shaped upstream portion and a substantially triangular-shaped downstream portion.

* * * * *